US008855381B2

(12) United States Patent
Monden

(10) Patent No.: US 8,855,381 B2
(45) Date of Patent: Oct. 7, 2014

(54) FAKE-FINGER DETERMINATION DEVICE, FAKE-FINGER DETERMINATION METHOD AND FAKE-FINGER DETERMINATION PROGRAM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 320 days.

(21) Appl. No.: 13/508,766

(22) PCT Filed: Oct. 6, 2010

(86) PCT No.: PCT/JP2010/067553
§ 371 (c)(1),
(2), (4) Date: May 9, 2012

(87) PCT Pub. No.: WO2011/058837
PCT Pub. Date: May 19, 2011

(65) Prior Publication Data
US 2012/0219194 A1 Aug. 30, 2012

(30) Foreign Application Priority Data
Nov. 10, 2009 (JP) .................................. 2009-256977

(51) Int. Cl.
*G06K 9/00* (2006.01)
(52) U.S. Cl.
USPC ......................................................... 382/124
(58) Field of Classification Search
None
See application file for complete search history.

(56) References Cited

U.S. PATENT DOCUMENTS

| 2006/0056661 | A1 | 3/2006 | Einighammer et al. |
| 2006/0147096 | A1* | 7/2006 | Lee et al. ...................... 382/124 |
| 2008/0192988 | A1 | 8/2008 | Uludag et al. |
| 2009/0304237 | A1 | 12/2009 | Yoshikawa et al. |
| 2009/0310827 | A1 | 12/2009 | Einighammer et al. |
| 2012/0033063 | A1 | 2/2012 | Einighammer et al. |

FOREIGN PATENT DOCUMENTS

| CN | 1541078 A | 10/2004 |
| CN | 101506826 A | 8/2009 |
| JP | 2637253 B2 | 8/1997 |

(Continued)

OTHER PUBLICATIONS

International Search Report for PCT/JP2010/067553 dated Nov. 2, 2010.

(Continued)

*Primary Examiner* — Chan Park
*Assistant Examiner* — Elisa Rice
(74) *Attorney, Agent, or Firm* — Sughrue Mion, PLLC

(57) ABSTRACT

The accuracy for determining a fake finger in which a thin film is attached to a surface of a finger is improved. A fake-finger determination device includes an imaging unit 10 that images a reflected light image and a transmitted light image of an authentication object serving as a fingerprint authentication object, a classifying unit 31 that classifies each of the reflected light image and the transmitted light image into a foreground portion having a feature of a skin image and a background portion having no feature of a skin image, based on a hue value of a pixel included in each of the images, a detecting unit 32 that compares the foreground portion of one image of the reflected light image and the transmitted light image with the background portion of the other image to detect an overlapping portion, and a determining unit 33 that determines whether or not a foreign substance is present in the periphery of a finger using the overlapping portion.

17 Claims, 8 Drawing Sheets

(56) References Cited

FOREIGN PATENT DOCUMENTS

| | | |
|---|---|---|
| JP | 2003-6645 A | 1/2003 |
| JP | 2003-50993 A | 2/2003 |
| JP | 2005-71118 A | 3/2005 |
| JP | 2007-7073 A | 1/2007 |
| JP | 2007-122237 A | 5/2007 |
| JP | 2008-6146 A | 1/2008 |
| JP | 2008-305427 A | 12/2008 |
| JP | 4611575 B2 | 1/2011 |
| WO | 2007/001025 A1 | 1/2007 |

OTHER PUBLICATIONS

Communication dated Aug. 20, 2014, issued by the Japanese Patent Office in counterpart Japanese application No. 2011-540449.

* cited by examiner

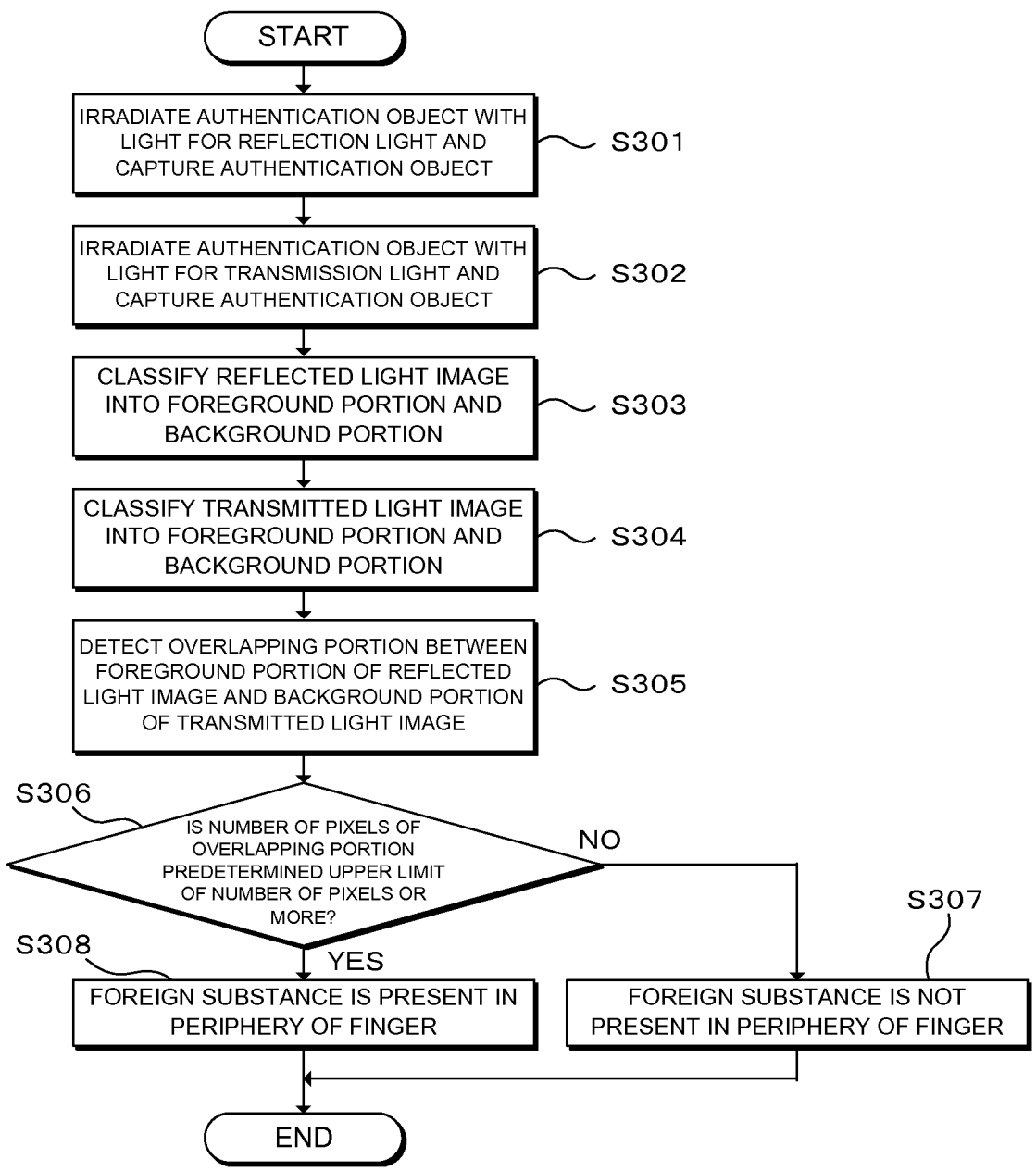

FAKE-FINGER DETERMINATION DEVICE, FAKE-FINGER DETERMINATION METHOD AND FAKE-FINGER DETERMINATION PROGRAM

CROSS REFERENCE TO RELATED APPLICATIONS

This application is a National Stage of International Application No. PCT/JP2010/067553 filed Oct. 6, 2010, claiming priority based on Japanese Patent Application No. 2009-256977 filed Nov. 10, 2009, the contents of all of which are incorporated herein by reference in their entirety.

The present invention relates to a fake-finger determination device, a fake-finger determination method, and a fake-finger determination program.

BACKGROUND

In recent years, fingerprint authentication has been attracting attention as one of authentication methods for identifying an individual. Fingerprints differ person to person and have a feature that does not change even though years have passed. Thus, fingerprint authentication is considered having higher reliability than currently prevailing password authentication and the like. Meanwhile, in fingerprint authentication, it is necessary to prevent wrongdoing that someone impersonates another person using a fake finger forged using another person's fingerprint. As techniques for preventing such wrongdoing, for example, Patent Documents 1 and 2 disclose techniques of detecting a fake finger based on a color of a surface of a finger irradiated with light.

Patent Document 1: Patent Publication JP-A-2003-50993
Patent Document 2: Japanese Patent Publication No. 2637253

However, in Patent Documents 1 and 2, since a fake finger is detected based on a color of a surface of a finger, a fake finger made such that a transparent or flesh-colored thin film duplicated from another person's fingerprint is attached to a surface of a finger is hardly discriminated. Particularly, a fake finger with a transparent thin film attached thereto is hardly discriminated since a color of a fake finger surface assimilates with a color of a skin.

SUMMARY

The present invention has been made to solve the above-mentioned problems, and it is an object of the present invention to provide a fake-finger determination device, a fake-finger determination method, and a fake-finger determination program, which are capable of improving the accuracy for determining a fake finger in which a thin film is attached to a surface of a finger.

A fake-finger determination device according to the present invention includes an imaging unit that images a reflected light image and a transmitted light image of an authentication object serving as a fingerprint authentication object, a classifying unit that classifies each of the reflected light image and the transmitted light image into a foreground portion having a feature of a skin image and a background portion having no feature of a skin image, based on a hue value or a brightness value of a pixel included in each of the images, a detecting unit that detects a portion that belongs to the foreground portion of one image of the reflected light image and the transmitted light image and belongs to the background portion of the other image, as an overlapping portion, and a determining unit that determines whether or not a foreign substance is present in the periphery of a finger using the overlapping portion.

Further, a fake-finger determination device according to the present invention includes an imaging unit that images a reflected light image and a transmitted light image of an authentication object serving as a fingerprint authentication object, a classifying unit that classifies a pixel group having a hue value corresponding to a flesh color and a pixel group other than this pixel group in the reflected light image as a foreground portion and a background portion, respectively, and classifies a pixel group having a hue value corresponding to white or a brightness value equal to or more than a predetermined threshold value and a pixel group other than this pixel group in the transmitted light image as a foreground portion and a background portion, respectively, a detecting unit that compares the background portion of the reflected light image with the foreground portion of the transmitted light image to detect an overlapping portion, and a determining unit that determines whether or not a foreign substance is present in the periphery of a finger using the overlapping portion.

Further, a fake-finger determination device according to the present invention includes an imaging unit that images a reflected light image and a transmitted light image of an authentication object serving as a fingerprint authentication object, a classifying unit that classifies a pixel group having a hue value corresponding to a flesh color and a pixel group other than this pixel group in each of the reflected light image and the transmitted light image as a foreground portion and a background portion, respectively, a detecting unit that compares the foreground portion of the reflected light image with the background portion of the transmitted light image to detect an overlapping portion, and a determining unit that determines whether or not a foreign substance is present in the periphery of a finger using the overlapping portion.

A method of determining a fake finger according to the present invention includes the steps of: imaging a reflected light image and a transmitted light image of an authentication object serving as a fingerprint authentication object; classifying each of the reflected light image and the transmitted light image into a foreground portion having a feature of a skin image and a background portion having no feature of a skin image, based on a hue value or a brightness value of a pixel included in each of the images; detecting a portion that belongs to a foreground portion of one image of the reflected light image and the transmitted light image and belongs to a background portion of the other image as an overlapping portion; and determining whether or not a foreign substance is present in the periphery of a finger using the overlapping portion.

Further, a method of determining a fake finger according to the present invention includes the steps of: imaging a reflected light image and a transmitted light image of an authentication object serving as a fingerprint authentication object; classifying a pixel group having a hue value corresponding to a flesh color and a pixel group other than this pixel group in the reflected light image as a foreground portion and a background portion, respectively, and classifying a pixel group having a hue value corresponding to white or a brightness value equal to or more than a predetermined threshold value and a pixel group other than this pixel group in the transmitted light image as a foreground portion and a background portion, respectively; comparing the background portion of the reflected light image with the foreground portion of the transmitted light image to detect an overlapping portion; and determining whether or not a foreign substance is present in the periphery of a finger using the overlapping portion.

Further, a method of determining a fake finger according to the present invention includes the steps of: imaging a reflected light image and a transmitted light image of an authentication object serving as a fingerprint authentication object; classifying a pixel group having a hue value corresponding to a flesh color and a pixel group other than this pixel group in each of the reflected light image and the transmitted light image as a foreground portion and a background portion, respectively; comparing the foreground portion of the reflected light image with the background portion of the transmitted light image to detect an overlapping portion; and determining whether or not a foreign substance is present in the periphery of a finger using the overlapping portion.

A fake-finger determination program according to the present invention causes a computer to execute the steps included in the above methods of determining the fake finger.

According to the present invention, it is possible to improve the accuracy for determining a fake finger in which a thin film is attached to a surface of a finger.

DESCRIPTION OF THE DRAWINGS

FIG. 8 is a flowchart for describing a fake-finger determination process according to a third embodiment.

DETAILED DESCRIPTION

Hereinafter, exemplary embodiments of a fake-finger determination device, a fake-finger determination method, and a fake-finger determination program according to the present invention will be described with reference to the accompanying drawings.

[First Embodiment]

Figure 1:
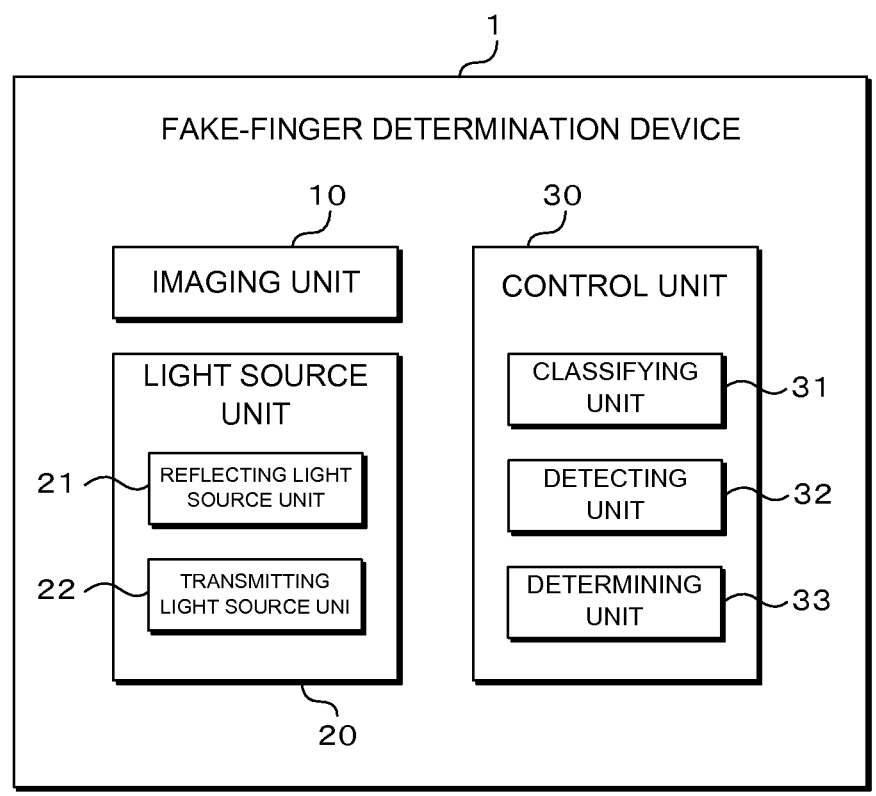
FIG. 1 is a block diagram illustrating a schematic configuration of a fake-finger determination device according to each embodiment.

First, a schematic configuration of a fake-finger determination device according to a first embodiment will be described with reference to FIG. 1. FIG. 1 is a diagram schematically illustrating a configuration of a fake-finger determination device. A fake-finger determination device 1 is a device that determines whether or not an authentication object serving as a fingerprint authentication object is a fake finger. For example, a finger that is an authentication object is placed on a predetermined placement area provided on a top surface of the fake-finger determination device 1. For example, the placement area is formed of a transparent plate, and allows the authentication object placed on the placement area to be captured from the inside of the fake-finger determination device 1.

As illustrated in FIG. 1, the fake-finger determination device 1 includes an imaging unit 10, a light source unit 20, and a control unit 30. Respective components of the imaging unit 10, the light source unit 20, and the control unit 30 included in the fake-finger determination device 1 are the same as in an imaging unit, a light source unit, and a control unit included in a conventional fingerprint authentication device in principle. However, the difference with the conventional fingerprint authentication device lies in that the light source unit 20 has a different arrangement, and the control unit 30 has various functions for determining forgery of an authentication object.

The fake-finger determination device 1 is physically configured to include a central processing unit (CPU), a memory, an imaging unit, and a light source unit. For example, the memory includes data processed by the CPU or a read only memory (ROM) that stores a program and a random access memory (RAM) used as various work areas mainly for control processing. The components are connected to one another through a bus. The CPU executes the program stored in the ROM and processes a reflected light image data and a transmitted light image data captured by the imaging unit using a variety of data developed in the RAM, so that function of the respective units of the fake-finger determination device 1, which will be described later, can be implemented.

For example, the imaging unit 10 is a color camera and captures an authentication object placed on the placement area. The present embodiment is described in connection with an example in which a color camera is used as the imaging unit 10, however, the imaging unit 10 is not limited to a color camera. For example, a black and white camera may be used as the imaging unit 10.

For example, the light source unit 20 includes a white light-emitting diode (LED), and irradiates the authentication object with light when the imaging unit 10 captures the authentication object. The light source unit 20 includes a reflecting light source unit 21 and a transmitting light source unit 22. The present embodiment is described in connection with an example in which a white LED is used as the light source unit 20, but the light source unit 20 is not limited to a white LED. A light source including a plurality of wavelengths may be used as the light source unit 20. In addition, a camera which can capture a plurality of wavelengths from a light source may be used as the imaging unit 10.

The reflecting light source unit 21 is arranged at the position at which light can be irradiated to the authentication object and reflected light from the authentication object is incident to the imaging unit 10. For example, a light-emitting surface of the reflecting light source unit 21 is arranged at the position at which light can be incident to the authentication object placed on the placement area through the transparent plate. When the authentication object is captured, light of the reflecting light source unit 21 is incident to the authentication object, and so the imaging unit 10 can capture the reflected light image of the authentication object.

The transmitting light source unit 22 is arranged at the position at which light is incident to the authentication object but the reflected light from the authentication object is not incident to the imaging unit 10. For example, a light-emitting surface of the transmitting light source unit 22 is arranged at the position at which light can be incident to the authentication object placed on the placement area without involving the transparent plate. When the authentication object is captured, light of the transmitting light source unit 22 is incident to the authentication object, and so the imaging unit 10 can capture the transmitted light image of the authentication object.

The control unit 30 controls the fake-finger determination device 1 in general by executing a variety of control processes. For example, the control unit 30 includes a classifying unit 31, a detecting unit 32, and a determining unit 33.

The classifying unit 31 classifies each of the reflected light image and the transmitted light image captured by the imaging unit 10 into a foreground portion having a feature of a skin image and a background portion having no feature of a skin image, based on a hue value of a pixel included in each of the images. A function of the classifying unit 31 will be concretely described below.

The classifying unit 31 classifies a pixel group having a hue value corresponding to a flesh color and a pixel group other than this pixel group in the reflected light image as a foreground portion and a background portion, respectively. For example, the hue value corresponding to the flesh color corresponds to a hue value of about 10 degrees to 50 degrees which can be a hue value of a flesh color which is a color of a skin when a hue value of a red is set to 0 degree in a hue, saturation, value (HSV) color space. The classifying unit 31 classifies a pixel group having a hue value corresponding to a flesh color and white and a pixel group other than this pixel group in the transmitted light image as a foreground portion and a background portion, respectively. The contents of the classifying process of each authentication object will be concretely described with reference to FIGS. 2 to 4.

Figure 2:
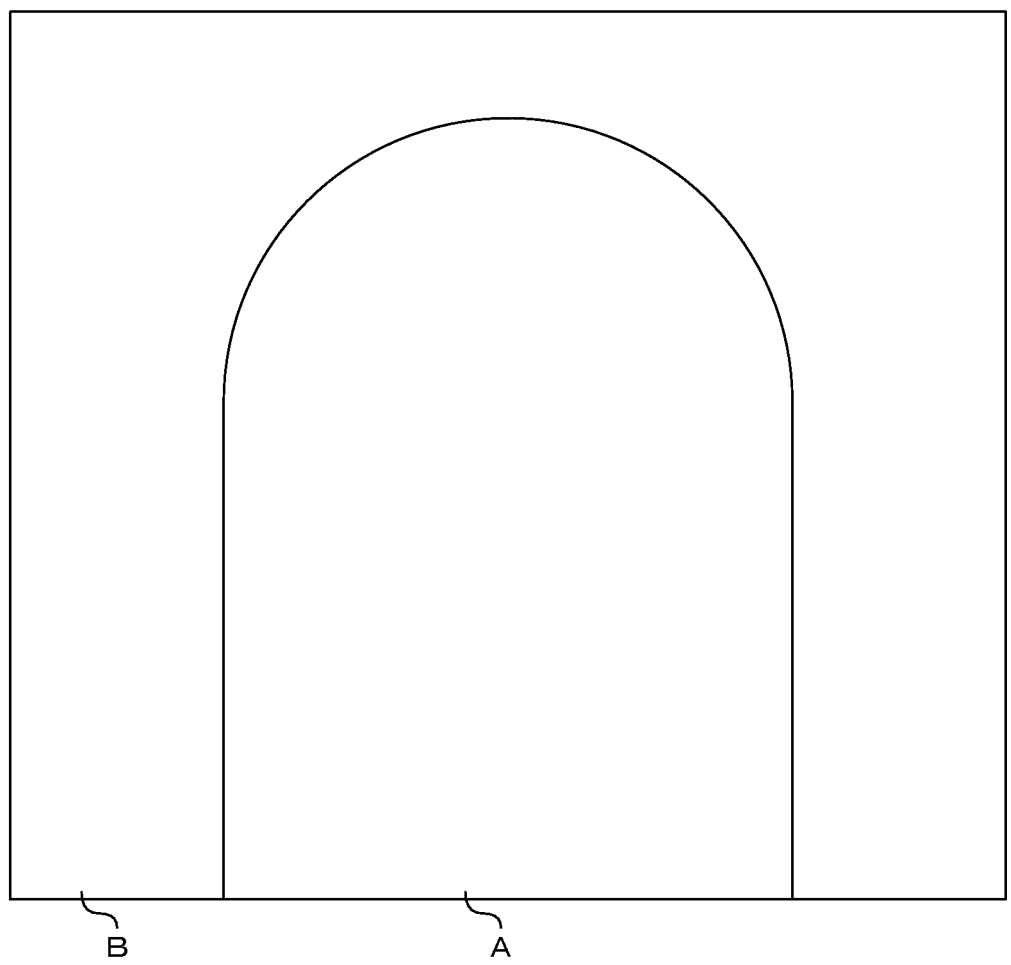
FIG. 2 is a schematic diagram for describing the content of a classifying process when a human finger is captured as an authentication object.

FIG. 2 is a diagram schematically illustrating a state in which a human finger is captured as the authentication object. In this case, in both the reflected light image and the transmitted light image, the classifying unit 31 classifies a pixel group of a human finger area A corresponding to a flesh color as a foreground portion, and classifies a pixel group of a background portion B other than the human finger area A as a background portion.

When the authentication object illustrated in FIG. 2 is classified as described above, a classification result of the reflected light image matches with a classification result of the transmitted light image.

Figure 3:
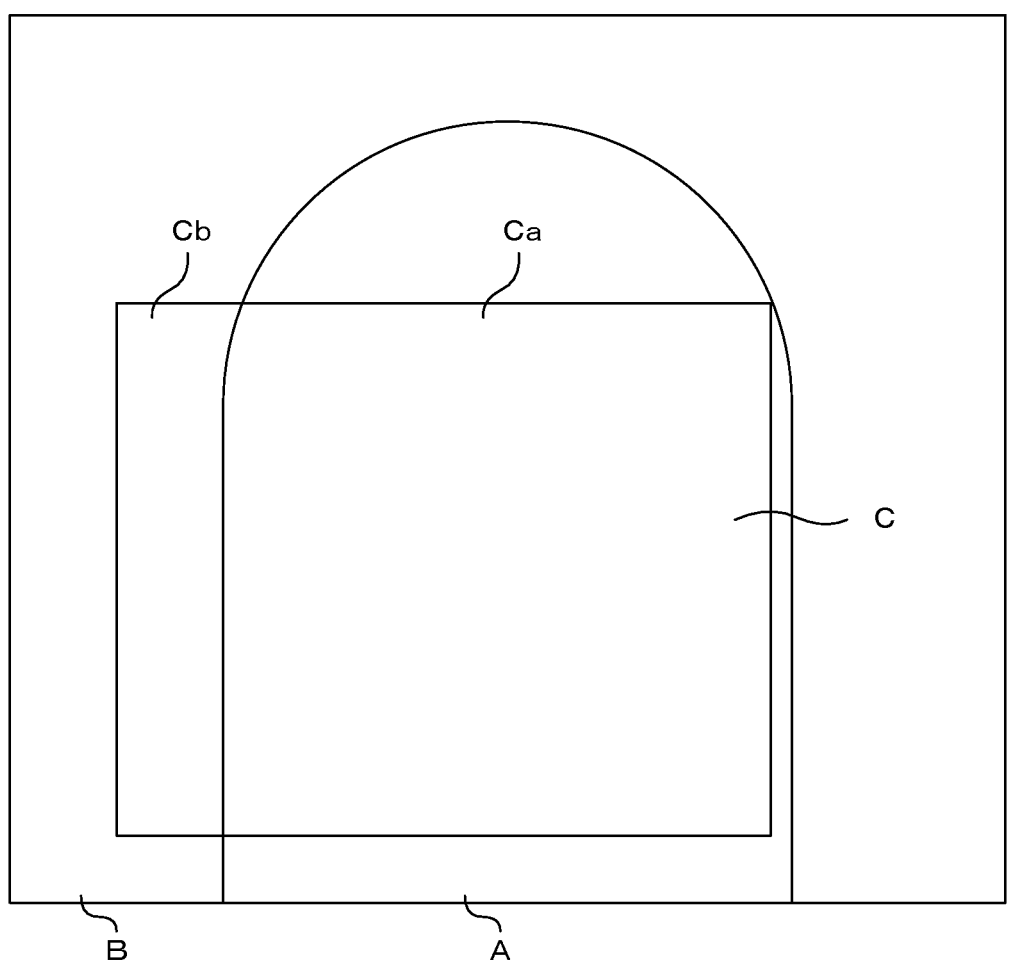
FIG. 3 is a schematic diagram for describing the content of a classifying process when a fake finger in which a transparent thin film is attached to a surface of a human finger is captured as an authentication object.

FIG. 3 is a diagram schematically illustrating a state in which a fake finger in which a transparent thin film is attached to a surface of a human finger is captured as an authentication object. In this case, the classifying unit 31 classifies a pixel group of a portion Ca (hereinafter, referred to as a "human finger portion film area Ca") of the transparent thin film area C overlapping the human finger area A and the human finger area A in the reflected light image as a foreground portion. Further, the classifying unit 31 classifies a pixel group a portion Cb (hereinafter, referred to as a "protrusion portion film area Cb") of the transparent thin film area C protruding from the vicinity of the human finger area A and the background portion B in the reflected light image as a background portion. The reason why the human finger portion film area Ca is classified as the foreground portion is because the human finger is captured through the transparent thin film. As a result, the human finger portion film area Ca becomes flesh-colored and has the feature of the skin image. The reason why the protrusion portion film area Cb is classified as the background portion is because the background is captured through the transparent thin film. As a result, the protrusion portion film area Cb becomes the same color as a background image and so does not have the feature of the skin image.

In the transmitted light image, the classifying unit 31 classifies a pixel group of the human finger area A and the transparent thin film area C as a foreground portion, and classifies a pixel group of the background portion B other than this pixel group as a background portion. The reason why the transparent thin film area C is classified as the foreground portion is because when light incident to the transparent thin film is bent inside the thin film and then incident to the imaging unit 10, brightness of the transparent thin film area C increases, and so the transparent thin film area C becomes flesh-colored or white. That is, in the transparent thin film area C, the human finger portion film area Ca becomes flesh-colored or white and so has the feature of the skin image, and the protrusion portion film area Cb becomes white and so has the feature of the skin image.

As described above, when the authentication object illustrated in FIG. 3 is classified, the protrusion portion film area Cb is classified as the background portion in the reflected light image but as the foreground portion in the transmitted light image. That is, the classification result on the protrusion portion film area Cb differs between the reflected light image and the transmitted light image.

Figure 4:
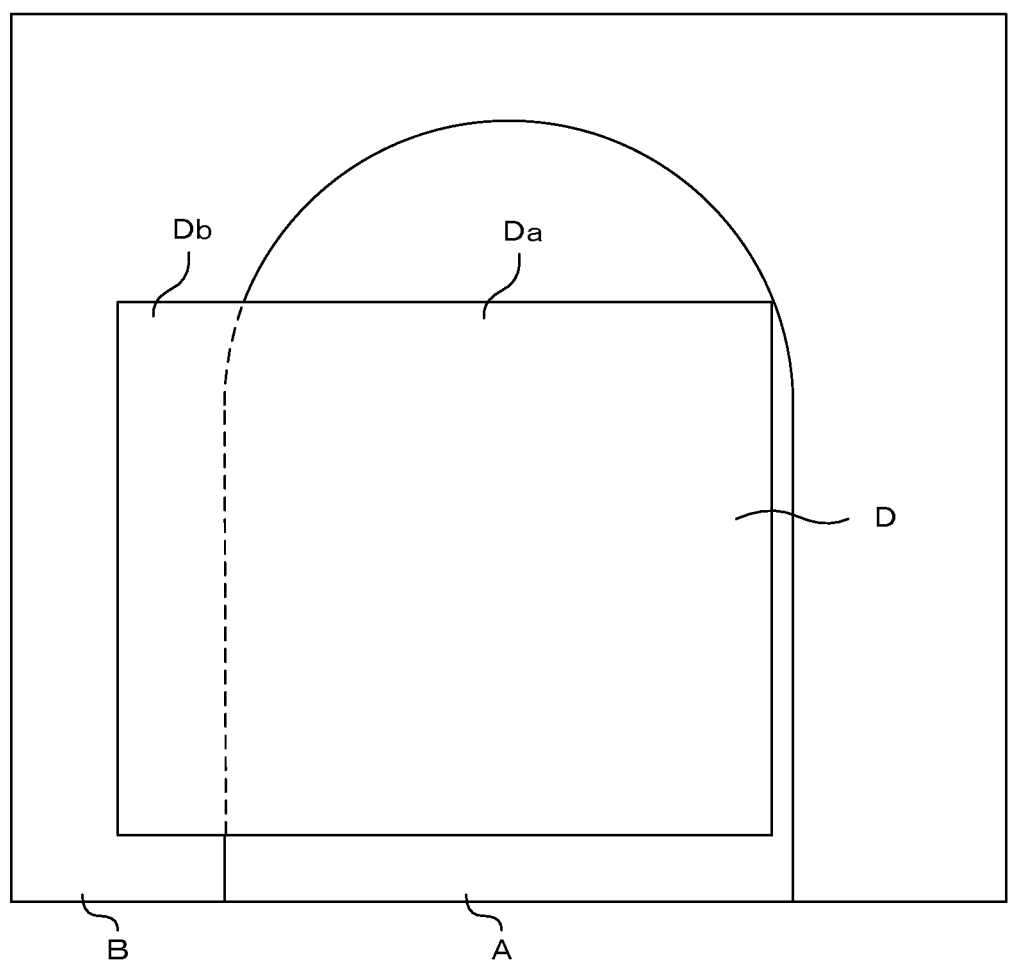
FIG. 4 is a schematic diagram for describing the content of a classifying process when a fake finger in which an opaque thin film of a flesh color is attached to a surface of a human finger is captured as an authentication object.

FIG. 4 is a schematic diagram for describing the content of the classifying process when a fake finger in which an opaque thin film of a flesh color is attached to the surface of the human finger is captured as the authentication object. In this case, in the reflected light image, the classifying unit 31 classifies a pixel group of the human finger area A and an opaque thin film area D of a flesh color as the foreground portion, and classifies a pixel group of the background portion B other than this pixel group as the background portion. The reason why the opaque thin film area D of the flesh color is classified as the foreground portion is because light reflected by the surface of the opaque thin film of the flesh color has a hue value corresponding to the flesh color and so has the feature of the skin image.

In the transmitted light image, the classifying unit 31 classifies a pixel group of the human finger area A as the foreground portion, and classifies a pixel group of the background portion B and the opaque thin film area D of the flesh color other than this pixel group as the background portion. The reason why the opaque thin film area D of the flesh color is classified as the background portion is because the opaque thin film of the flesh color blocks light and becomes dark, and so the opaque thin film area D of the flesh color does not become a flesh color or white and so does not have the feature of the skin image.

As described above, when the authentication object illustrated in FIG. 4 is classified, the opaque thin film area D of the flesh color is classified as the foreground portion in the reflected light image but as the background portion in the transmitted light image. That is, the classification result on the opaque thin film area D of the flesh color differs between the reflected light image and the transmitted light image.

Further, the classifying unit 31 uses the hue value corresponding to the flesh color as the condition for classifying the reflected light image, and uses the hue value corresponding to the flesh color and the white as the condition for classifying the transmitted light image. However, the classification condition is not limited thereto. For example, a hue value that a skin image can have may be used as the classification condition. The hue value that the skin image can have may be decided by an experiment or the like. Further, when a black and white camera is used as the imaging unit 10, a brightness value may be used as the classification condition. Specifically, for example, in each of the reflected light image and the transmitted light image, the classifying unit 31 may classify, as the foreground portion, a pixel group having a brightness value that a skin image can have, and may classify a pixel group other than this pixel group as the background portion.

The brightness value that the skin image can have may be decided in an experiment or the like.

The detecting unit 32 compares the foreground portion of one image of the reflected light image and the transmitted light image with the background portion of the other image, and detects an overlapping portion. As a result, a portion having a different classification result between the reflected light image and the transmitted light image can be detected. A function of the detecting unit 32 will be concretely described below.

The detecting unit 32 compares the background portion of the reflected light image with the foreground portion of the transmitted light image, and detects an overlapping portion. The overlapping portion detected by the comparison corresponds to the protrusion portion film area Cb illustrated in FIG. 3. That is, when the overlapping portion is detected by the comparison, a possibility that the transparent thin film is attached to the surface of the human finger is high.

The detecting unit 32 compares the foreground portion of the reflected light image with the background portion of the transmitted light image, and detects an overlapping portion. The overlapping portion detected by the comparison corresponds to the opaque thin film area D of the flesh color illustrated in FIG. 4. That is, when the overlapping portion is detected by the comparison, a possibility that the opaque thin film of the flesh color is attached to the surface of the human finger is high.

The detecting unit 32 compares the foreground portion of one image of the reflected light image and the transmitted light image with the background portion of the other image, and detects the overlapping portion. However, the method of detecting the overlapping portion is not limited thereto. For example, the overlapping portion may be detected by comparing a portion that differs between the foreground portion of the reflected light image and the foreground portion of the transmitted light image with a portion that differs between the background portion of the reflected light image and the background portion of the transmitted light image. In this case, the portion that differs between the foreground portion of the reflected light image and the foreground portion of the transmitted light image is identical to the portion that differs between the background portion of the reflected light image and the background portion of the transmitted light image in principle. Thus, the portion that differs between the foreground portion of the reflected light image and the foreground portion of the transmitted light image or the portion that differs between the background portion of the reflected light image and the background portion of the transmitted light image in principle may be detected as the overlapping portion. That is, a portion that belongs to a foreground portion of one image of the reflected light image and the transmitted light image and belongs to a background portion of the other image is preferably detected as the overlapping portion.

The determining unit 33 determines whether or not a foreign substance is present in the periphery of a finger based on the size of the overlapping portion detected by the detecting unit 32. As a result, it is possible to prevent the fake finger from being erroneously determined by the erroneously detected overlapping portion. A function of the determining unit 33 will be concretely described below.

The determining unit 33 determines that a foreign substance is present in the periphery of a finger when the number of pixels included in the overlapping portion is a predetermined upper limit of the number of pixels or more. That is, the authentication object is determined as the fake finger. For example, an upper limit of the number of pixels that causes an erroneous detection by which it is determined that a foreign substance is present when a human finger is captured as an authentication object may be set as the upper limit of the number of pixels. A plurality of values may be set as the predetermined upper limits of the number of pixels depending on the situation. For example, when the protrusion portion film area Cb illustrated in FIG. 3 is detected as the overlapping portion, the size for determining the presence of the foreign substance is different from that when the opaque thin film area D of the flesh color illustrated in FIG. 4 is detected as the overlapping portion. Thus, the upper limit of the number of pixels may be set depending on each situation. Further, since a ratio of a film image may differ according to the size of the finger, the upper limit of the number of pixels may be set depending on the size of the human finger area A.

Thus, when the number of pixels of the overlapping portion detected between the background portion of the reflected light image and the foreground portion of the transmitted light image is the predetermined upper limit of the number of pixels or more, it can be determined that the transparent thin film remains attached to the surface of the human finger. On the other hand, when the number of pixels of the overlapping portion detected between the foreground portion of the reflected light image and the background portion of the transmitted light image is the predetermined upper limit of the number of pixels or more, it can be determined that the opaque thin film of the flesh color remains attached to the surface of the human finger.

Figure 5:
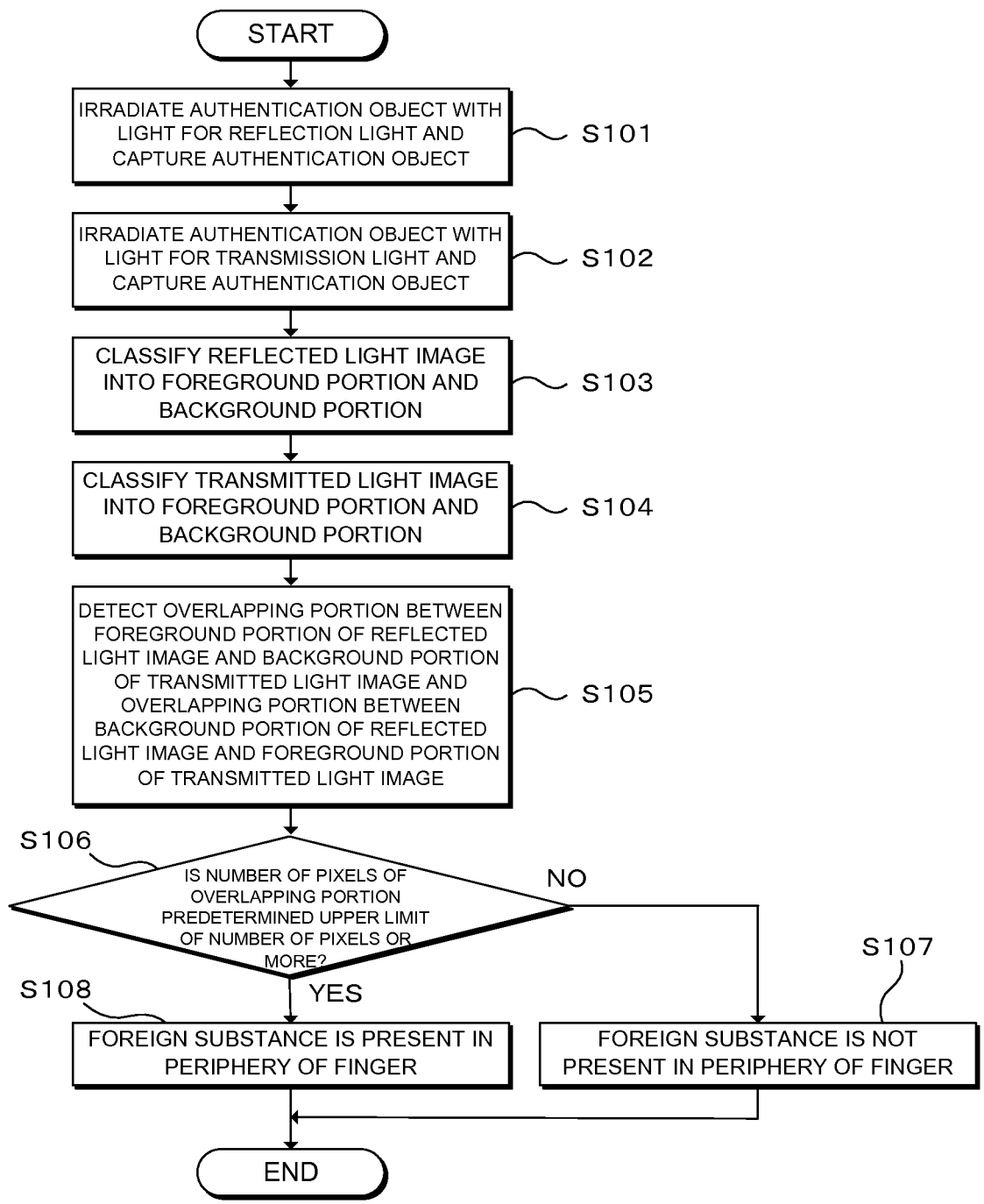
FIG. 5 is a flowchart for describing a fake-finger determination process according to a first embodiment.

Next, a fake-finger determination process executed by the fake-finger determination device according to the first embodiment will be described with reference to FIG. 5. FIG. 5 is a flowchart illustrating a process procedure for determining a fake finger in which a transparent thin film is attached to a surface of a finger.

First, when an authentication object is placed on the placement area of the fake-finger determination device 1, the reflecting light source unit 21 irradiates the authentication object with light, and the imaging unit 10 captures the authentication object (step S101).

Subsequently, the transmitting light source unit 22 irradiates the authentication object with light, and the imaging unit 10 captures the authentication object (step S102).

Subsequently, the classifying unit 31 classifies a reflected light image captured in step S101 into a foreground portion including a pixel group having a hue value corresponding to a flesh color and a background portion including a pixel group other than this pixel group (step S103).

Subsequently, the classifying unit 31 classifies a transmitted light image captured in step S102 into a foreground portion including a pixel group having a hue value corresponding to a flesh color and white and a background portion including a pixel group other than this pixel group (step S104).

Subsequently, the detecting unit 32 detects an overlapping portion by comparing the foreground portion of the reflected light image with the background portion of the transmitted light image, and detects an overlapping portion by comparing the background portion of the reflected light image with the foreground portion of the transmitted light image (step S105).

Subsequently, the determining unit 33 determines whether or not the number of pixels included in the overlapping portion detected in step S105 is a predetermined upper limit of the number of pixels or more (step S106). When the determination result is NO (NO in step S106), the determining unit 33 determines that a foreign substance is not present in the periphery of the finger (step S107). In other words, the authentication object is determined as the human finger, and then the fake-finger determination process ends.

However, when it is determined in step S106 that the number of pixels included in the overlapping portion is the predetermined upper limit of the number of pixels or more (YES in step S106), the determining unit 33 determines that a foreign substance is present in the periphery of the finger (step S108). In other words, the authentication object is determined as a fake finger, and then the fake-finger determination process ends.

As described above, according to the fake-finger determination device 1 of the first embodiment, each of the reflected light image and the transmitted light image captured by the imaging unit 10 is classified into the foreground portion or the background portion, and the overlapping portion can be detected by comparing the foreground portion of one image of the reflected light image and the transmitted light image with the background portion of the other image. Thus, even when the fake finger in which the transparent thin film is attached to the surface of the finger or the fake finger in which the opaque thin film of the flesh color is attached to the surface of the finger is used as the authentication object, the fake finger can be determined by detecting a thin film portion present in the periphery of the finger.

Further, when the number of pixels of the overlapping portion is the predetermined upper limit of the number of pixels or more, it can be determined that a foreign substance is present in the periphery of a finger. Thus, it is possible to prevent the fake finger from being erroneously determined by the erroneously detected overlapping portion. Accordingly, it is possible to improve the accuracy for determining a fake finger in which a thin film is attached to a surface of a finger.

[Second Embodiment]

Figure 6:
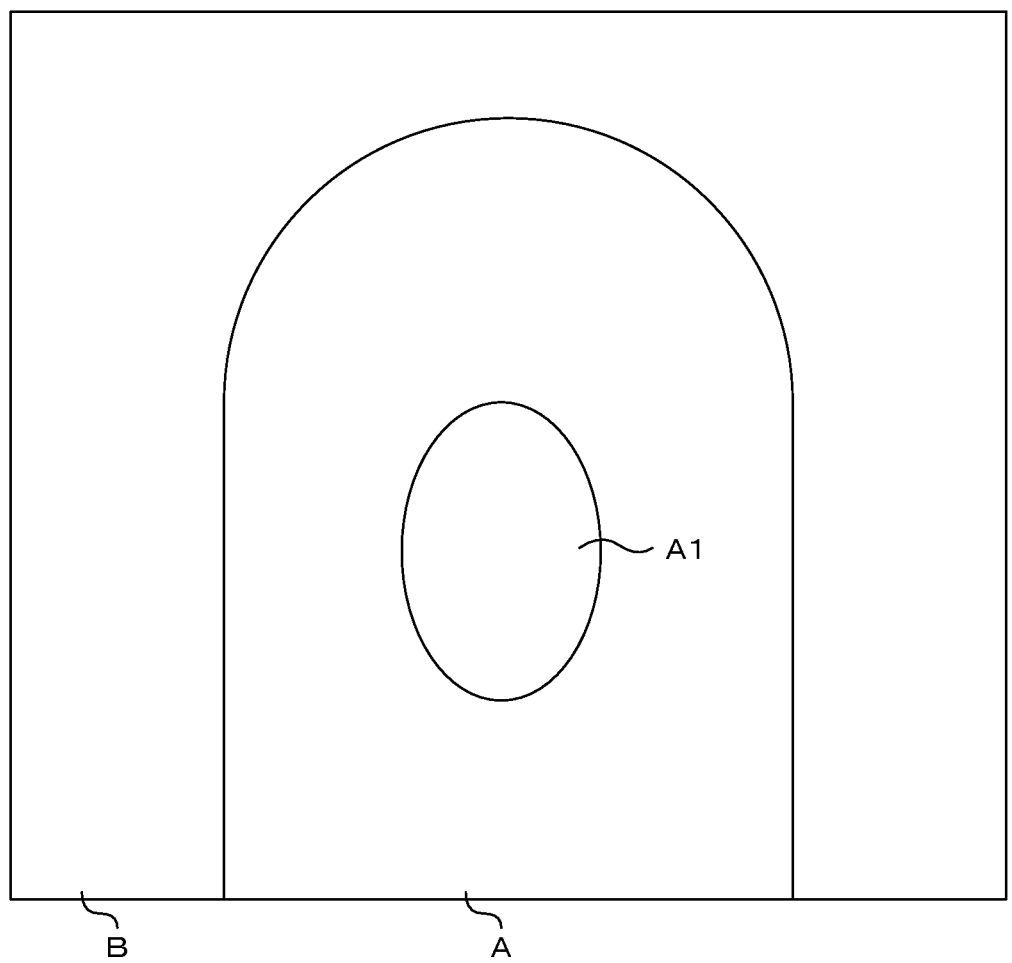
FIG. 6 is a schematic diagram for describing the content of a classifying process when a human finger having an easily reflected portion is captured as an authentication object.

In the first embodiment, the fake-finger determination device 1 classifies the reflected light image into the foreground portion and the background portion using the hue value corresponding to the flesh color. Thus, for example, as illustrated in FIG. 6, when reflected light becomes intense in a partial area A1 of the human finger area A, the partial area A1 may become white and be classified as the background portion. In this case, in the transmitted light image, the partial area A1 of the human finger area A becomes flesh-colored and so is classified as the foreground portion. As a result, the partial area A1 of the human finger area A is detected as the foreign substance, and thus the human finger is erroneously determined as the fake finger.

A fake-finger determination device according to a second embodiment prevents an erroneous determination by specializing the fake-finger determination process in a process for determining a fake finger with a transparent thin film attached thereto. As a result, in the fake-finger determination device according to the second embodiment, it is impossible to determine a fake finger with an opaque thin film of a flesh color attached thereto, however, it is possible to determine a fake finger with a transparent thin film attached thereto or a human finger that reflected light became intense in a partial area thereof.

The fake-finger determination device according to the second embodiment is different from the fake-finger determination device according to the first embodiment in functions of the classifying unit 31 and the detecting unit 32 of the control unit 30. The other components are the same as the respective components of the fake-finger determination device according to the first embodiment. Thus, the same components are denoted by the same reference numerals, and a description thereof will not be made. In the following, a description will be made in connection with the difference with the first embodiment.

The classifying unit 31 classifies a pixel group having a hue value corresponding to white or a brightness value of a predetermined threshold value or more in the transmitted light image as the foreground portion unlike the classifying unit 31 of the first embodiment that classifies a pixel group having a hue value corresponding to a flesh color and white in the transmitted light image as the foreground portion. Thus, the foreground portion of the transmitted light image does not include a pixel group having a hue value corresponding to a flesh color. For example, a lower limit value of a brightness value assumed to be obtained in a transparent thin film image in the transmitted light image may be used as the predetermined threshold value. The predetermined threshold value may be decided by an experiment or the like. The reflected light image is classified into the foreground portion and the background portion in the same way as the classifying unit 31 of the first embodiment.

The detecting unit 32 limits a comparison for detecting the overlapping portion to a comparison between the background portion of the reflected light image and the foreground portion of the transmitted light image unlike the detecting unit 32 of the first embodiment that compare the background portion of the reflected light image with the foreground portion of the transmitted light image, and compares the foreground portion of the reflected light image with the background portion of the transmitted light image.

The content of the fake-finger determination process of each authentication object will be concretely described below with reference to the drawings.

When the authentication object illustrated in FIG. 6 is classified, in the reflected light image, similarly to the first embodiment, the classifying unit 31 classifies a pixel group of the human finger area A (excluding the partial area A1) as the foreground portion, and classifies a pixel group of the partial area A1 of the human finger area A and the background portion B as the background portion. However, in the transmitted light image, the classifying unit 31 classifies all pixel groups including the human finger area A and the background portion B as the background portion. That is, the foreground portion of the transmitted light image is not formed in principle.

As described above, when the authentication object illustrated in FIG. 6 is classified, an overlapping portion of the background portion of the reflected light image and the foreground portion of the transmitted light image is not present in principle. Thus, it is difficult for the detecting unit 32 to detect the overlapping portion, and the determining unit 33 determines that the authentication object illustrated in FIG. 6 is the human finger. That is, the fake-finger determination device according to the second embodiment can determine the human finger that the reflected light became intense in its partial area as a proper finger.

When the authentication object illustrated in FIG. 3 is classified, in the reflected light image, similarly to the first embodiment, the classifying unit 31 classifies a pixel group of the human finger portion film area Ca and the human finger area A as the foreground portion, and classifies a pixel group of the protrusion portion film area Cb and the background portion B as the background portion. However, in the transmitted light image, the classifying unit 31 classifies a pixel group of the protrusion portion film area Cb as the foreground portion, and classifies a pixel group of the human finger area A, the human finger portion film area Ca, and the background portion B other than this pixel group as the background portion.

As described above, when the authentication object illustrated in FIG. 3 is classified, the protrusion portion film area Cb is classified as the background portion in the reflected light image but as the foreground portion in the transmitted light image. Thus, the detecting unit 32 detects the protrusion portion film area Cb as the overlapping portion of the background portion of the reflected light image and the foreground portion of the transmitted light image. The determining unit 33 determines that the authentication object illustrated in FIG. 3 is the fake finger when the number of pixels of the protrusion portion film area Cb is a predetermined upper limit of the number of pixels or more. That is, the fake-finger determination device according to the second embodiment can determine that the fake finger in which the transparent thin film is attached to the surface of the finger is an improper finger.

Figure 7:
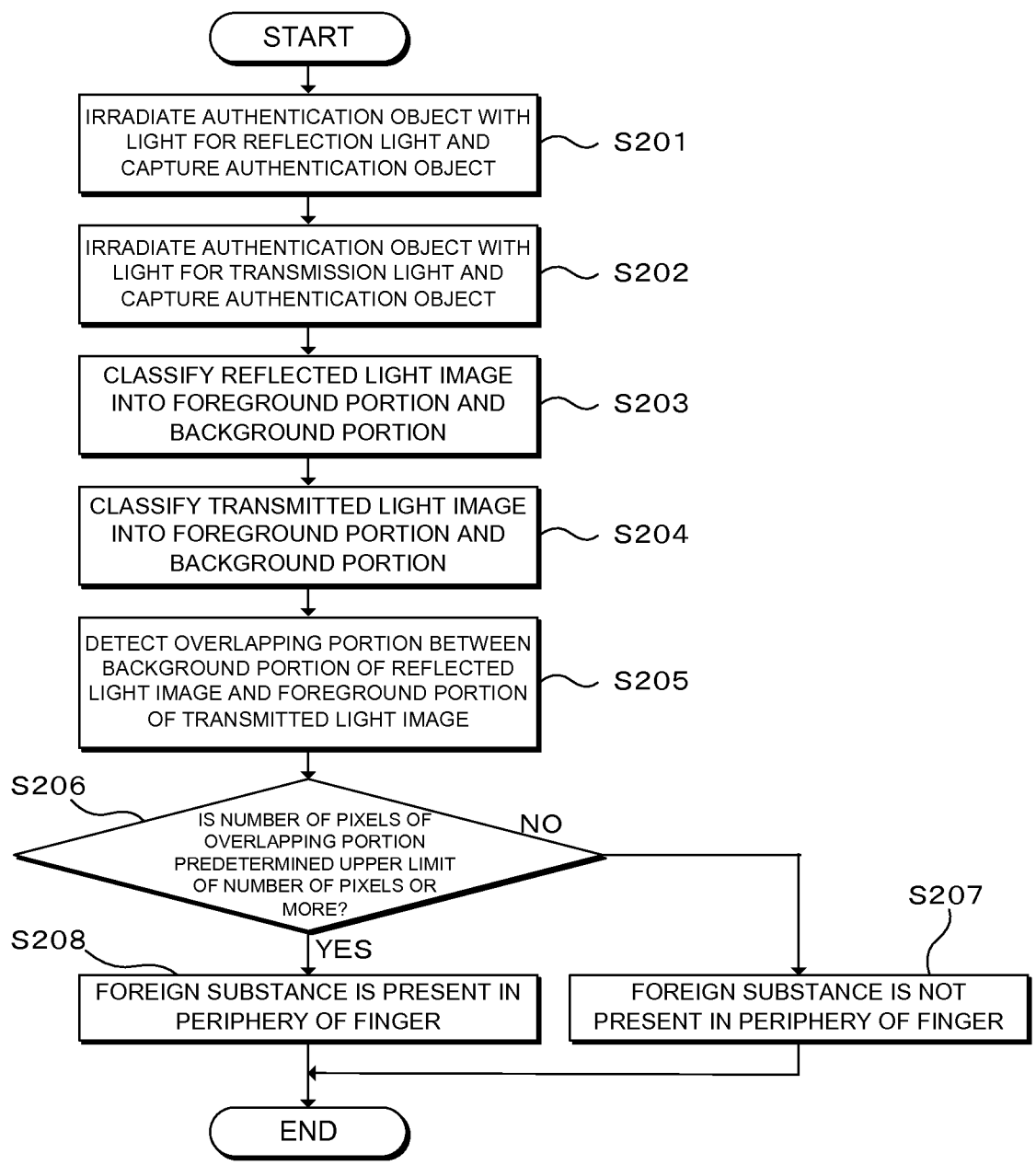
FIG. 7 is a flowchart for describing a fake-finger determination process according to a second embodiment.

Next, a fake-finger determination process executed by the fake-finger determination device according to the second embodiment will be described with reference to FIG. 7. FIG. 7 is a flowchart illustrating a process procedure for determining a fake finger in which the transparent thin film is attached to the surface of the finger.

First, when an authentication object is placed on the placement area of the fake-finger determination device 1, the reflecting light source unit 21 irradiates the authentication object with light, and the imaging unit 10 captures the authentication object (step S201).

Subsequently, the transmitting light source unit 22 irradiates the authentication object with light, and the imaging unit 10 captures the authentication object (step S202).

Subsequently, the classifying unit 31 classifies a reflected light image captured in step S201 into a foreground portion including a pixel group having a hue value corresponding to a flesh color and a background portion including a pixel group other than this pixel group (step S203).

Subsequently, the classifying unit 31 classifies a transmitted light image captured in step S202 into a foreground portion including a pixel group having a hue value corresponding to white or a brightness value of a predetermined threshold value or more and a background portion including a pixel group other than this pixel group (step S204).

Subsequently, the detecting unit 32 compares the background portion of the reflected light image with the foreground portion of the transmitted light image, and detects the overlapping portion (step S205).

Subsequently, the determining unit 33 determines whether or not the number of pixels included in the overlapping portion detected in step S205 is a predetermined upper limit of the number of pixels or more (step S206). When the determination result is NO (NO in step S206), the determining unit 33 determines that a foreign substance is not present in the periphery of the finger (step S207). In other words, the authentication object is determined as the human finger, and then the fake-finger determination process ends.

However, when it is determined in step S206 that the number of pixels included in the overlapping portion is the predetermined upper limit of the number of pixels or more (YES in step S206), the determining unit 33 determines that a foreign substance is present in the periphery of the finger (step S208). In other words, the authentication object is determined as a fake finger, and then the fake-finger determination process ends.

As described above, according to the fake-finger determination device 1 of the second embodiment, each of the reflected light image and the transmitted light image captured by the imaging unit 10 is classified into the foreground portion or the background portion, and the overlapping portion can be detected by comparing the background portion of the reflected light image with the foreground portion of the transmitted light image. Thus, even when the fake finger to which the transparent thin film is attached to the surface of the finger is used as the authentication object, the fake finger can be picked out by detecting a thin film portion present in the periphery of the finger. Further, when the reflected light became intense in a portion of the human finger, the human finger is not erroneously determined as the fake finger, and the human finger can be accurately determined.

Further, when the number of pixels of the overlapping portion is the predetermined upper limit of the number of pixels or more, it can be determined that a foreign substance is present in the periphery of a finger. Thus, it is possible to prevent the fake finger from being erroneously determined by the erroneously detected overlapping portion. Accordingly, it is possible to improve the accuracy for determining a fake finger in which a thin film is attached to the surface of the finger.

[Third Embodiment]

As described in the beginning section of the second embodiment, the fake-finger determination device 1 according to the first embodiment may detect the partial area A1 of the human finger area A illustrated in FIG. 6 and erroneously determine that the human finger is the fake finger. In this regard, a fake-finger determination device according to a third embodiment prevents an erroneous determination by specializing the fake-finger determination process in a process for determining a fake finger with an opaque thin film of a flesh color attached thereto. As a result, in the fake-finger determination device according to the third embodiment, it is impossible to determine a fake finger with a transparent thin film attached thereto, however, it is possible to determine a fake finger with an opaque thin film of a flesh color attached thereto or a human finger that reflected light became intense in a portion thereof.

The fake-finger determination device according to the third embodiment is different from the fake-finger determination device according to the first embodiment in functions of the classifying unit 31 and the detecting unit 32 of the control unit 30. The other components are the same as the respective components of the fake-finger determination device according to the first embodiment. Thus, the same components are denoted by the same reference numerals, and a description thereof will not be made. In the following, a description will be made in connection with the difference with the first embodiment.

The classifying unit 31 classifies a pixel group having a hue value corresponding to a flesh color in the transmitted light image as the foreground portion unlike the classifying unit 31 of the first embodiment that classifies a pixel group having a hue value corresponding to a flesh color and white in the transmitted light image as the foreground portion. Thus, the foreground portion of the transmitted light image does not include a pixel group having a hue value corresponding to white. The reflected light image is classified into the foreground portion and the background portion in the same way as the classifying unit 31 of the first embodiment.

The detecting unit 32 limits a comparison for detecting the overlapping portion to a comparison between the foreground portion of the reflected light image and the background portion of the transmitted light image unlike the detecting unit 32 of the first embodiment that compares the background portion of the reflected light image with the foreground portion of the transmitted light image, and compares the foreground portion of the reflected light image with the background portion of the transmitted light image.

The content of the fake-finger determination process of each authentication object will be concretely described below with reference to the drawings.

When the authentication object illustrated in FIG. 6 is classified, in the reflected light image, similarly to the first embodiment, the classifying unit 31 classifies a pixel group of the human finger area A (excluding the partial area A1) as the foreground portion, and classifies a pixel group of the partial area A1 of the human finger area A and the background portion B as the background portion. However, in the transmitted light image, the classifying unit 31 classifies a pixel group of the human finger area A (including the partial area A1) as the foreground portion, and classifies a pixel group of the background portion B as the background portion.

As described above, when the authentication object illustrated in FIG. 6 is classified, an overlapping portion of the foreground portion of the reflected light image and the background portion of the transmitted light image is not present in principle. Thus, it is difficult for the detecting unit 32 to detect the overlapping portion, and the determining unit 33 determines that the authentication object illustrated in FIG. 6 is the human finger. That is, the fake-finger determination device according to the third embodiment can determine the human finger that the reflected light became intense in its partial area as a legitimate finger.

When the authentication object illustrated in FIG. 4 is classified, in the reflected light image, similarly to the first embodiment, the classifying unit 31 classifies a pixel group of the human finger area A and the opaque thin film area D of the flesh color as the foreground portion, and classifies a pixel group of the background portion B as the background portion. However, in the transmitted light image, the classifying unit 31 classifies a pixel group of the human finger area A (excluding the opaque thin film area D portion of the flesh color) as the foreground portion, and classifies a pixel group of the opaque thin film area D of the flesh color and the background portion B as the background portion.

As described above, when the authentication object illustrated in FIG. 4 is classified, the opaque thin film area D of the flesh color is classified as the foreground portion in the reflected light image but as the background portion in the transmitted light image. Thus, the detecting unit 32 detects the opaque thin film area D of the flesh color as the overlapping portion of the foreground portion of the reflected light image and the background portion of the transmitted light image. The determining unit 33 determines that the authentication object illustrated in FIG. 4 is the fake finger when the number of pixels of the opaque thin film area D of the flesh color is a predetermined upper limit of the number of pixels or more. That is, the fake-finger determination device according to the third embodiment can determine that the fake finger in which the opaque thin film of the flesh color is attached to the surface of the finger is an improper finger.

Next, a fake-finger determination process executed by the fake-finger determination device according to the third embodiment will be described with reference to FIG. 8. FIG. 8 is a flowchart illustrating a process procedure for determining a fake finger in which the opaque thin film of the flesh color is attached to the surface of the finger.

Initially, when an authentication object is placed on the placement area of the fake-finger determination device 1, the reflecting light source unit 21 irradiates the authentication object with light, and the imaging unit 10 captures the authentication object (step S301).

Subsequently, the transmitting light source unit 22 irradiates the authentication object with light, and the imaging unit 10 captures the authentication object (step S302).

Subsequently, the classifying unit 31 classifies a reflected light image captured in step S301 into a foreground portion including a pixel group having a hue value corresponding to a flesh color and a background portion including a pixel group other than this pixel group (step S303).

Subsequently, the classifying unit 31 classifies a transmitted light image captured in step S302 into a foreground portion including a pixel group having a hue value corresponding to a flesh color and a background portion including a pixel group other than this pixel group (step S304).

Subsequently, the detecting unit 32 compares the foreground portion of the reflected light image with the background portion of the transmitted light image, and detects the overlapping portion (step S305).

Subsequently, the determining unit 33 determines whether or not the number of pixels included in the overlapping portion detected in step S305 is a predetermined upper limit of the number of pixels or more (step S306). When the determination result is NO (NO in step S306), the determining unit 33 determines that a foreign substance is not present in the periphery of the finger (step S307). In other words, the authentication object is determined as the human finger, and then the fake-finger determination process ends.

However, when it is determined in step S306 that the number of pixels included in the overlapping portion is the predetermined upper limit of the number of pixels or more (YES in step S306), the determining unit 33 determines that a foreign substance is present in the periphery of the finger (step S308). In other words, the authentication object is determined as a fake finger, and then the fake-finger determination process ends.

As described above, according to the fake-finger determination device 1 of the third embodiment, each of the reflected light image and the transmitted light image captured by the imaging unit 10 is classified into the foreground portion or the background portion, and the overlapping portion can be detected by comparing the background portion of the reflected light image with the foreground portion of the transmitted light image. Thus, even when the fake finger to which the opaque thin film of the flesh color is attached to the surface of the finger is used as the authentication object, the fake finger can be picked out by detecting a thin film portion present in the periphery of the finger. Further, when the reflected light became intense in a partial area of the human finger, the human finger is not erroneously determined as the fake finger, and the human finger can be accurately determined.

Further, when the number of pixels of the overlapping portion is the predetermined upper limit of the number of pixels or more, it can be determined that a foreign substance is present in the periphery of a finger. Thus, it is possible to prevent the fake finger from being erroneously determined by the erroneously detected overlapping portion. Accordingly, it is possible to improve the accuracy for determining a fake finger in which a thin film is attached to a surface of a finger.

The above embodiments are exemplary embodiment and are not intended to exclude the application of various modification or techniques which are not explicitly described in the embodiments. That is, the present invention can be modified and embodied in various forms in the scope not departing from the gist thereof. For example, the fake-finger determination process of the above embodiments may be appropriately combined.

The present application contains subject matter related to that disclosed in Japanese Patent Application No. 2009-256977 filed in the Japan Patent Office on Nov. 10, 2009, the entire content of which is hereby incorporated by reference.

Hereinbefore, the present invention has been described with reference to the exemplary embodiments, but the present invention is not limited to the above embodiments. The configuration or the details of the present invention can be modified in various forms which can be understood by those skilled in the art within the scope of the present invention.

A fake-finger determination device, a fake-finger determination method, and a fake-finger determination program according to the present invention are suitable for improving the accuracy for determining a fake finger in which a thin film is attached to a surface of a finger.

1 fake-finger determination device
10 imaging unit
20 light source unit
21 reflecting light source unit
22 transmitting light source unit
30 control unit
31 classifying unit
32 detecting unit
33 determining unit

What is claimed is:

1. A fake-finger determination device, comprising:
an imaging unit that images a reflected light image and a transmitted light image of an authentication object serving as a fingerprint authentication object;
a classifying unit that classifies each of the reflected light image and the transmitted light image into a foreground portion having a feature of a skin image and a background portion having no feature of a skin image, based on a hue value or a brightness value of a pixel included in each of the images;
a detecting unit that detects a portion that belongs to the foreground portion of one image of the reflected light image and the transmitted light image and belongs to the background portion of the other image, as an overlapping portion; and
a determining unit that determines whether or not a foreign substance is present in the periphery of a finger using the overlapping portion.

2. The fake-finger determination device according to claim 1,
wherein in each of the reflected light image and the transmitted light image, the classifying unit classifies, as the foreground portion, a pixel group having a hue value or a brightness value that a skin image can have, and classifies a pixel group other than this pixel group as the background portion.

3. The fake-finger determination device according to claim 2,
wherein the classifying unit classifies a pixel group having a hue value corresponding to a flesh color in the reflected light image as the foreground portion, and classifies a pixel group having a hue value corresponding to a flesh color and white in the transmitted light image as the foreground portion.

4. The fake-finger determination device according to claim 1,
wherein the detecting unit detects, as the overlapping portion, a portion which is different between the foreground portions of the reflected light image and the transmitted light image or a portion which is different between the background portions of the reflected light image and the transmitted light image.

5. The fake-finger determination device according to claim 1,
wherein the detecting unit compares the background portion of the reflected light image with the foreground portion of the transmitted light image to detect the overlapping portion.

6. The fake-finger determination device according to claim 1,
wherein the detecting unit compares the foreground portion of the reflected light image with the background portion of the transmitted light image to detect the overlapping portion.

7. A fake-finger determination device, comprising:
an imaging unit that images a reflected light image and a transmitted light image of an authentication object serving as a fingerprint authentication object;
a classifying unit that classifies a pixel group having a hue value corresponding to a flesh color and a pixel group other than this pixel group in the reflected light image as a foreground portion and a background portion, respectively, and classifies a pixel group having a hue value corresponding to white or a brightness value equal to or more than a predetermined threshold value and a pixel group other than this pixel group in the transmitted light image as a foreground portion and a background portion, respectively;
a detecting unit that compares the background portion of the reflected light image with the foreground portion of the transmitted light image to detect an overlapping portion; and
a determining unit that determines whether or not a foreign substance is present in the periphery of a finger using the overlapping portion.

8. A fake-finger determination device, comprising:
an imaging unit that images a reflected light image and a transmitted light image of an authentication object serving as a fingerprint authentication object;
a classifying unit that classifies a pixel group having a hue value corresponding to a flesh color and a pixel group other than this pixel group in each of the reflected light image and the transmitted light image as a foreground portion and a background portion, respectively;
a detecting unit that compares the foreground portion of the reflected light image with the background portion of the transmitted light image to detect an overlapping portion; and
a determining unit that determines whether or not a foreign substance is present in the periphery of a finger using the overlapping portion.

9. The fake-finger determination device according to claim 1,
wherein the determining unit determines whether or not a foreign substance is present in the periphery of a finger based on the size of the overlapping portion.

10. The fake-finger determination device according to claim 7,
wherein the determining unit determines whether or not a foreign substance is present in the periphery of a finger based on the size of the overlapping portion.

11. The fake-finger determination device according to claim 8,
wherein the determining unit determines whether or not a foreign substance is present in the periphery of a finger based on the size of the overlapping portion.

12. A method of determining a fake finger, comprising the steps of:
- imaging a reflected light image and a transmitted light image of an authentication object serving as a fingerprint authentication object;
- classifying each of the reflected light image and the transmitted light image into a foreground portion having a feature of a skin image and a background portion having no feature of a skin image, based on a hue value or a brightness value of a pixel included in each of the images;
- detecting a portion that belongs to the foreground portion of one image of the reflected light image and the transmitted light image and belongs to the background portion of the other image, as an overlapping portion; and
- determining whether or not a foreign substance is present in the periphery of a finger using the overlapping portion.

13. A method of determining a fake finger, comprising the steps of:
- imaging a reflected light image and a transmitted light image of an authentication object serving as a fingerprint authentication object;
- classifying a pixel group having a hue value corresponding to a flesh color and a pixel group other than this pixel group in the reflected light image as a foreground portion and a background portion, respectively, and classifying a pixel group having a hue value corresponding to white or a brightness value equal to or more than a predetermined threshold value and a pixel group other than this pixel group in the transmitted light image as a foreground portion and a background portion, respectively;
- comparing the background portion of the reflected light image with the foreground portion of the transmitted light image to detect an overlapping portion; and
- determining whether or not a foreign substance is present in the periphery of a finger using the overlapping portion.

14. A method of determining a fake finger, comprising the steps of:
- imaging a reflected light image and a transmitted light image of an authentication object serving as a fingerprint authentication object;
- classifying a pixel group having a hue value corresponding to a flesh color and a pixel group other than this pixel group in each of the reflected light image and the transmitted light image as a foreground portion and a background portion, respectively;
- comparing the foreground portion of the reflected light image with the background portion of the transmitted light image to detect an overlapping portion; and
- determining whether or not a foreign substance is present in the periphery of a finger using the overlapping portion.

15. A non-transitory computer readable information recording medium storing a fake-finger determination program which causes a computer to execute the steps recited in claim 12.

16. A non-transitory computer readable information recording medium storing a fake-finger determination program which causes a computer to execute the steps recited in claim 13.

17. A non-transitory computer readable information recording medium storing a fake-finger determination program which causes a computer to execute the steps recited in claim 14.

* * * * *